United States Patent
Suciu et al.

(10) Patent No.: US 11,519,289 B2
(45) Date of Patent: Dec. 6, 2022

(54) SYSTEMS AND METHODS FOR HYBRID ELECTRIC TURBINE ENGINES

(71) Applicant: UNITED TECHNOLOGIES CORPORATION, Farmington, CT (US)

(72) Inventors: Gabriel L. Suciu, Glastonbury, CT (US); Om P. Sharma, South Windsor, CT (US); Joseph B. Staubach, Colchester, CT (US); Marc J. Muldoon, Marlborough, CT (US); Jesse M. Chandler, South Windsor, CT (US); David Lei Ma, Avon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 199 days.

(21) Appl. No.: 16/706,058

(22) Filed: Dec. 6, 2019

(65) Prior Publication Data
US 2021/0172333 A1 Jun. 10, 2021

(51) Int. Cl.
| | | |
|---|---|---|
| B64D 27/00 | (2006.01) | |
| F01D 15/10 | (2006.01) | |
| F02C 3/10 | (2006.01) | |
| F02K 5/00 | (2006.01) | |
| B64D 27/02 | (2006.01) | |

(52) U.S. Cl.
CPC ............... *F01D 15/10* (2013.01); *F02C 3/10* (2013.01); *F02K 5/00* (2013.01); *B64D 2027/026* (2013.01)

(58) Field of Classification Search
CPC . B64D 27/023; B64D 2027/026; F02K 3/068; F02K 3/12
See application file for complete search history.

(56) References Cited

U.S. PATENT DOCUMENTS

| | | | |
|---|---|---|---|
| 2,601,194 A | 6/1952 | Whittle | |
| 3,355,890 A | 12/1967 | Kappus | |
| 3,368,352 A * | 2/1968 | Hewson | .................. F02K 3/025 60/262 |
| 4,833,881 A | 5/1989 | Vdoviak | |
| 8,015,796 B2 | 9/2011 | Babu | |
| 8,684,304 B2 | 4/2014 | Burns et al. | |
| 8,727,270 B2 | 5/2014 | Burns et al. | |
| 9,908,635 B2 | 3/2018 | Snyder | |

(Continued)

FOREIGN PATENT DOCUMENTS

| | | |
|---|---|---|
| DE | 102013209538 | 11/2014 |
| EP | 3015696 | 5/2016 |
| WO | 2020008147 | 1/2020 |

OTHER PUBLICATIONS

European Patent Office, European Partial Search Report dated Sep. 1, 2021 in Application No. 21152583.7.

(Continued)

*Primary Examiner* — Gerald L Sung
(74) *Attorney, Agent, or Firm* — Snell & Wilmer L.L.P

(57) ABSTRACT

A hybrid electric gas turbine engine includes a fan section having a fan, a turbine section having a turbine drivably connected to the fan through a main shaft that extends along a central longitudinal axis, a gas generating core extending along a first axis that is radially offset from the central longitudinal axis, and an electric motor drivably connected to the main shaft, wherein the electric motor is colinear with the main shaft.

20 Claims, 4 Drawing Sheets

(56) References Cited

U.S. PATENT DOCUMENTS

| | | |
|---|---|---|
| 9,920,689 B2 | 3/2018 | Nalim |
| 10,024,235 B2 | 7/2018 | Suciu et al. |
| 10,094,281 B2 * | 10/2018 | Chandler .................. F02C 6/06 |
| 10,641,124 B2 * | 5/2020 | Chandler .................. F02C 7/36 |
| 11,073,107 B1 * | 7/2021 | Kupratis .................. F02K 3/06 |
| 2010/0044504 A1 * | 2/2010 | Cazals .................. B64D 41/00 |
| | | 244/58 |
| 2015/0013306 A1 | 1/2015 | Shelley |
| 2015/0211416 A1 | 7/2015 | Chandler |
| 2015/0247456 A1 * | 9/2015 | Suciu ..................... F02C 6/02 |
| | | 60/791 |
| 2015/0367950 A1 | 12/2015 | Rajashekara et al. |
| 2017/0226934 A1 | 8/2017 | Robic et al. |
| 2018/0009536 A1 | 1/2018 | Christopherson |
| 2018/0163558 A1 * | 6/2018 | Vondrell ................. F01D 15/10 |
| 2018/0230845 A1 | 8/2018 | Joshi et al. |
| 2018/0266329 A1 | 9/2018 | Mackin |
| 2018/0354631 A1 | 12/2018 | Adibhatla et al. |
| 2018/0363564 A1 | 12/2018 | Geneste |
| 2019/0323426 A1 | 10/2019 | Mackin |
| 2019/0353104 A1 | 11/2019 | Kupratis et al. |
| 2019/0368370 A1 | 12/2019 | Chandler |
| 2020/0003126 A1 | 1/2020 | De Wergifosse |

OTHER PUBLICATIONS

USPTO, Pre-Interview First Office Action dated Apr. 19, 2021 in U.S. Appl. No. 16/752,020.

USPTO, Notice of Allowance dated May 18, 2021 in U.S. Appl. No. 16/752,020.

European Patent Office, European Search Report dated Mar. 31, 2021 in Application No. 20211349.4.

USPTO, Corrected Notice of Allowance dated Jun. 8, 2021 in U.S. Appl. No. 16/752,020.

European Patent Office, European Office Action dated Jun. 15, 2021 in Application No. 21152583.7.

USPTO, Non-Final Office Action dated Apr. 18, 2022 in U.S. Appl. No. 17/350,767.

* cited by examiner

SYSTEMS AND METHODS FOR HYBRID ELECTRIC TURBINE ENGINES

FIELD

This disclosure relates generally to gas turbine engines, and more particularly for systems and methods for hybrid electric gas turbine engines.

BACKGROUND

A gas turbine engine typically includes a fan section driven by a core engine or gas generating core arranged along a common axis. The core engine includes a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section through a driven shaft.

SUMMARY

A hybrid electric gas turbine engine is disclosed, comprising a fan section having a fan, a turbine section having a turbine drivably connected to the fan through a main shaft that extends along a central longitudinal axis, a gas generating core extending along a first axis that is radially offset from the central longitudinal axis, and an electric motor drivably connected to the main shaft, wherein the electric motor is colinear with the main shaft.

In various embodiments, the electric motor comprises a motor shaft extending along an electric motor axis, wherein the electric motor axis is in colinear relationship with the central longitudinal axis.

In various embodiments, the gas generating core is sized and configured to provide between 30% and 70% of a maximum static takeoff thrust of the hybrid electric gas turbine engine.

In various embodiments, the first axis is in a non-parallel relationship with the central longitudinal axis.

In various embodiments, the gas generating core includes a compressor section extending along the first axis.

In various embodiments, the electric motor is configured to drive the fan.

In various embodiments, the electric motor is configured to be driven by the main shaft.

A hybrid electric gas turbine engine is disclosed, comprising a fan section having a fan and a guide vane extending from a static structure, a turbine section having an exit housing and a turbine drivably connected to the fan through a main shaft that extends along a central longitudinal axis, a gas generating core extending along a first axis that is radially offset from the central longitudinal axis, and an electric motor drivably connected to the main shaft, the electric motor being radially offset from the gas generating core.

In various embodiments, the hybrid electric gas turbine engine further comprises a support structure extending between and operatively connects the static structure and the exit housing.

In various embodiments, the electric motor is disposed radially inward from the gas generating core.

In various embodiments, the hybrid electric gas turbine engine further comprises a shroud extending from the static structure towards the turbine, the shroud being disposed about at least a portion of at least one of the electric motor, and the gas generating core.

In various embodiments, the hybrid electric gas turbine engine further comprises an inlet duct whereby the gas generating core receives air from the fan section.

In various embodiments, the hybrid electric gas turbine engine further comprises a shroud extending from the static structure towards the turbine, the shroud being disposed about at least a portion of at least one of the electric motor, and the gas generating core, and an inlet duct whereby the gas generating core is configured to receive air from the fan section, wherein the inlet duct is disposed at least partially radially outward from the shroud.

In various embodiments, the inlet duct is configured to receive the air via the guide vane.

In various embodiments, the inlet duct is disposed radially outward from the static structure.

In various embodiments, the hybrid electric gas turbine engine further comprises an exhaust duct that extends from an end of the gas generating core towards the turbine.

In various embodiments, the inlet duct is disposed radially outward from the static structure.

In various embodiments, at least a portion of the inlet duct is disposed radially outward from a radially inward end of the guide vane.

A method for assembling a hybrid electric gas turbine engine is disclosed, comprising coupling a fan section having a fan to a turbine section having an exit housing via a main shaft that extends along a central longitudinal axis, wherein the turbine section is drivably connected to the fan via the main shaft, coupling a gas generating core between a static structure of the fan section and the turbine section, wherein the gas generating core extends along a first axis that is radially offset from the central longitudinal axis, and coupling an electric motor to the main shaft, wherein the electric motor is colinear with the main shaft and drivably connected to the main shaft, the electric motor being radially offset from the gas generating core.

In various embodiments, the method further comprises disposing a guide vane to extend from the static structure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

Figure 1:
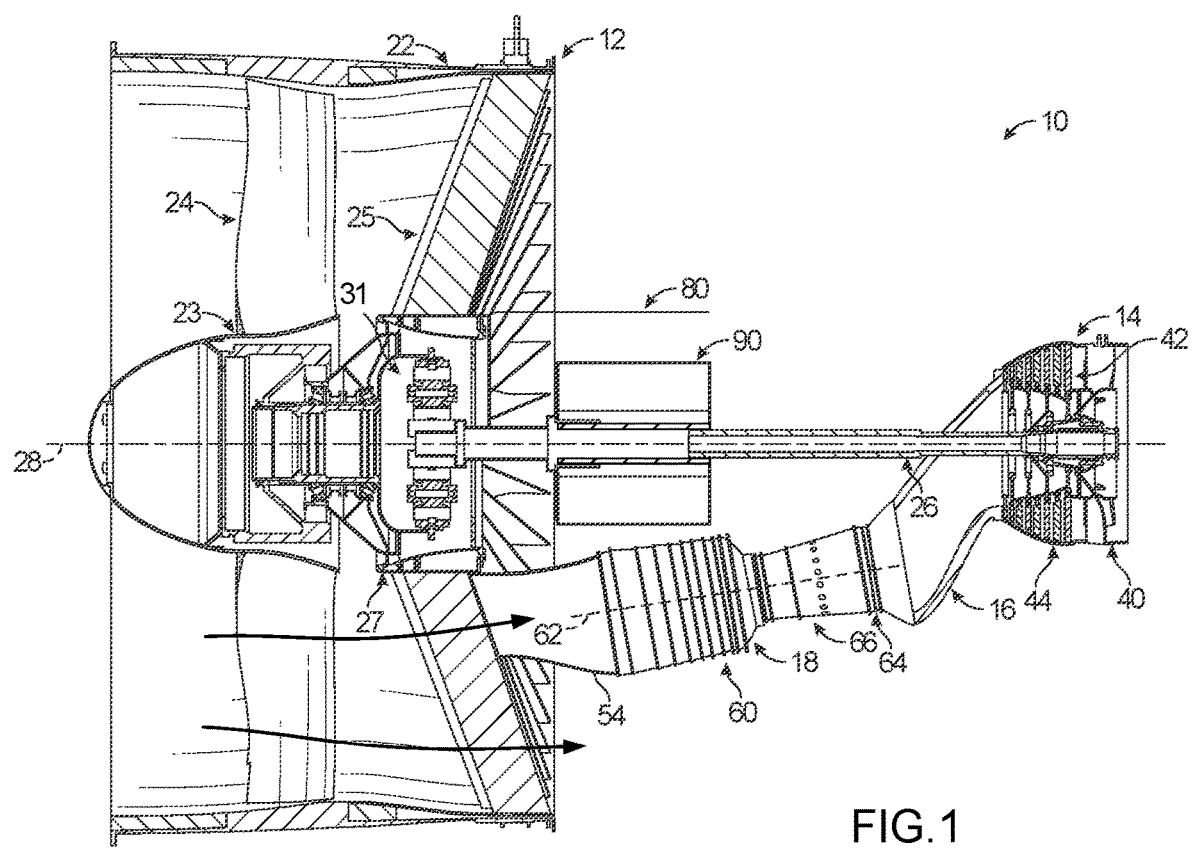
FIG. 1 illustrates a partial cross-sectional view of a hybrid electric gas turbine engine, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Hybrid electric gas turbine engines, as disclosed herein, implement a gas generating core that is offset from a central longitudinal axis of the gas turbine engine, and an electric motor disposed in concentric relationship with the central longitudinal axis. In this manner, the gas generating core of the hybrid electric gas turbine engine may be sized for optimal performance during cruise conditions, and the electric motor may supplement power during non-cruise conditions when extra power is needed, such as during take-off conditions for example. The electric motor is disposed in concentric relationship with the central longitudinal axis such that the main shaft is coupled directly to the electric motor (e.g., without the use of additional gear boxes). In this manner, and due to the location of the electric motor, the electric motor may be sized such that a single electric motor provides sufficient boost power to support take-off conditions of the aircraft, while providing a robust connection with the main shaft. For example, by placing the electric motor in concentric relationship with the central longitudinal axis, the electric motor may be sized to be a high-megawatt electric motor, such as greater than 7 megawatts (MW) in accordance with various embodiments, between 7 and 15 megawatts (MW) in accordance with various embodiments, or about 10 megawatts (MW) in accordance with various embodiments, which allows for a single electric motor to provide sufficient boost power.

FIG. 1 schematically illustrates a hybrid electric gas turbine engine 10. The hybrid electric gas turbine engine 10 includes a fan section 12, a turbine section 14, an exhaust duct 16, at least one gas generating core 18, and an electric motor 90. The electric motor may drive the main shaft, and/or may be driven by the main shaft, for example to generate electricity during cruise and/or descent conditions.

The fan section 12 includes a fan case 22 that receives a fan 24 that extends from a rotating hub 23 and fan guide vanes 25 that extend from a static structure such as an inner fixed structure 27. The rotating hub 23 and the fan 24 are driven by a fan shaft or a main shaft 26 (e.g. low speed spool) that extends between the fan section 12 and the turbine section 14 along a central longitudinal axis 28. The main shaft 26 extends through the inner fixed structure 27 to rotate the fan 24 and the hub 23 about the central longitudinal axis 28. In various embodiments, the main shaft 26 is operatively coupled to the fan 24 and the hub 23 via a gear box 31 (e.g., a planetary gear box).

Figure 2:
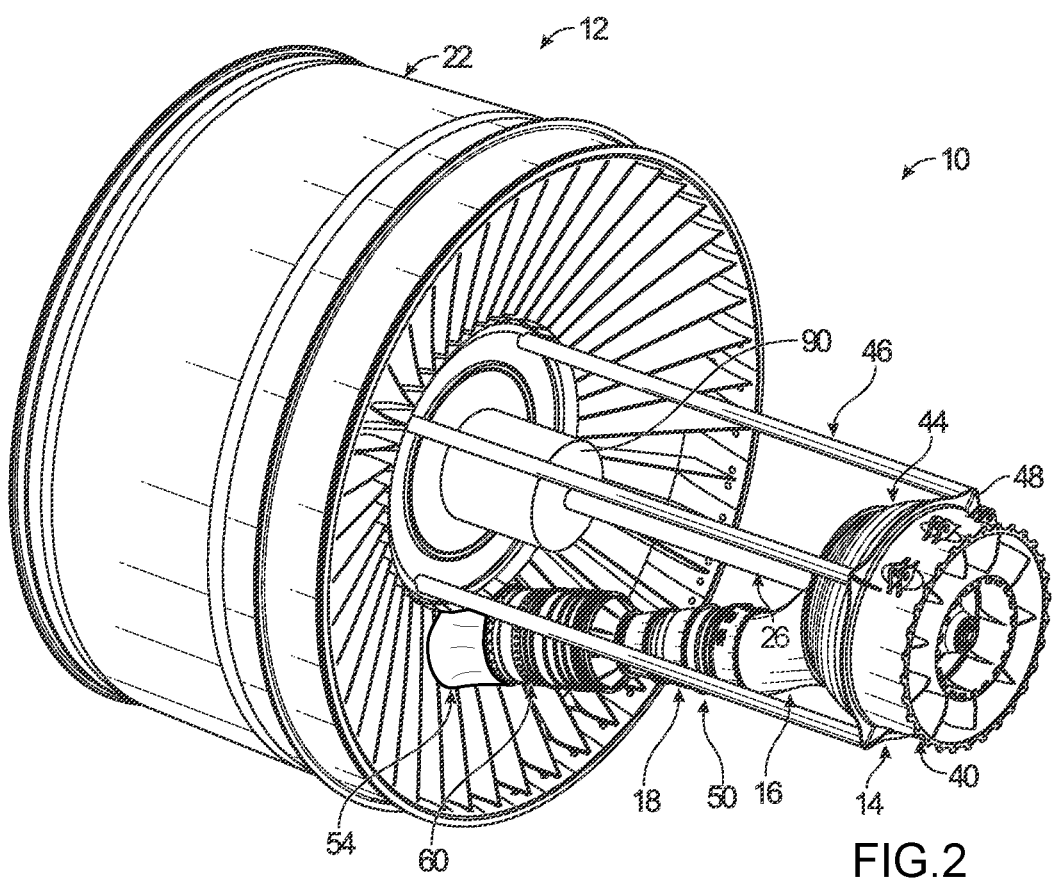
FIG. 2 illustrates a perspective view of the hybrid electric gas turbine engine, in accordance with various embodiments.

Referring to FIG. 1 and FIG. 2, the turbine section 14 is disposed axially downstream of the fan section 12 along the central longitudinal axis 28. The turbine section 14 includes an exit housing 40 and a turbine 42. The exit housing 40 and the turbine 42 are operatively and/or fluidly connected to at least one gas generating core 18. A turbine housing 44 is arranged to receive a fluid flow from at least one gas generating core 18 to rotate the turbine 42. The turbine 42 is rotatably disposed within the turbine housing 44 that is operatively connected to the exit housing 40. The turbine 42 is drivably connected to the fan 24 through the main shaft 26.

In various embodiments, gas generating core 18 is in operation during takeoff, climb, and cruise conditions. In various embodiments, ground idle may be accomplished with power from electric motor 90. In various embodiments, ground idle may be accomplished with power from gas generating core 18. Takeoff power may be reached by using both power sources combined (gas generating core 18 and electric motor 90). In various embodiments, gas generating core 18 is sized and configured to provide between 30% and 70% of maximum static take-off thrust and electric motor 90 may be sized and configured to provide between 30% and 70% of maximum static take-off thrust. In various embodiments, gas generating core 18 is sized and configured to provide between 40% and 60% of maximum static take-off thrust and electric motor 90 may be sized and configured to provide between 40% and 60% of maximum static take-off thrust. In various embodiments, gas generating core 18 is sized and configured to provide approximately half of the maximum static take-off thrust and electric motor 90 may be sized and configured to provide approximately half (e.g., the remainder) of the maximum static take-off thrust. In this manner, gas generating core 18 may be sized for optimal performance during cruise conditions, thereby increasing overall efficiency of the gas turbine engine. During descent, the gas generating core 18 may be turned off and the electric motor may provide regenerative power by allowing the fan 24 to operate as a turbine (due to ram effect) and turn the electric motor 90 generator. This regenerative power may be used to charge batteries used for powering the electric motor. Furthermore, by allowing the fan 24 to operate as a turbine and turn the electric motor 90, the fan 24 may provide air braking to the aircraft (e.g., during descent). In various embodiments, both power sources (gas generating core 18 and electric motor 90) may be used for generating reverse thrust (e.g., during a landing maneuver).

As shown in FIG. 2, a support structure 46 extends between and operatively connects the static structure (e.g. inner fixed structure 27) of the fan section 12 and the exit housing 40. In such an embodiment, a mounting flange 48 radially extends from the exit housing 40. The support structure 46 is operably connected to the mounting flange 48. Additional support structures, such as structural beams or cross-beams may be provided to add stiffness.

At least one gas generating core 18 may include a core engine or gas generating core 50 radially offset from the central longitudinal axis 28. In other embodiments, additional or fewer gas generating cores may be provided. The gas generating core 50 is axially disposed between the fan section 12 and the turbine section 14, with respect to the central longitudinal axis 28.

The gas generating core 50 may be a single spool gas generator, a dual spool gas generator, or a multispool gas generator. The gas generating core 50 is positioned to receive air from the fan 24 and drive the turbine 42 that in turn drives the fan 24.

The fan 24 delivers air into the fan case 22 and a portion of the air passes through an inlet duct 54 of the gas generating core 50 and into the gas generating core 50. In various embodiments, the inlet duct 54 is disposed radially outward from the inner fixed structure 27. In various embodiments, the inlet duct 54 is axially aligned with fan guide vanes 25. In various embodiments, a radially inward portion of the inlet duct 54 is partially defined by the inner fixed structure 27. Stated differently, inner fixed structure 27 may be disposed radially inward from the inlet duct 54. In this regard, the fan 24 may deliver air into the fan case 22 and the air passes through fan guide vanes 25 and a portion of this air flowing through fan exit guide vanes may pass through inlet duct 54 of the gas generating core 50 and into the gas generating core 50. A portion of the inlet duct 54 may be disposed radially outward from a radially inward end of at least one of the guide vanes 25. The gas generating core 50 includes a compressor section 60 driven by a shaft that extends along an axis 62 that is disposed in a non-parallel relationship with the central longitudinal axis 28. The shaft is in turn, driven by a turbine section 64 that drives the compressor section 60. A combustor section 66 is positioned between the compressor section 60 and the turbine section 64.

The exhaust duct 16 extends from the turbine section 64 of the gas generating core 50 towards the turbine section 14. The products of combustion, from the turbine section 64 of the gas generating core 50, pass through the exhaust duct 16 and across the turbine 42, which rotates about the central longitudinal axis 28 to, in turn, rotate the main shaft 26 and the fan 24. The exhaust duct 16 extends from an end of the turbine section 64 of gas generating core 50 to fluidly connect the gas generating core 50 to the turbine section 14.

The gas generating core 50 extends about or extends along the axis 62, which is offset, or angularly skewed, relative to the central longitudinal axis 28 of the main shaft 26 such that the gas generating core 50 is radially offset, angularly skewed, or disposed in a non-parallel relationship relative to the central longitudinal axis 28 of the main shaft 26.

The offset gas generating core architecture enables the use of a much smaller gas generating core(s). The gas generating core 50 may be much smaller than traditional gas turbine engine cores because the gas generating core 50 is not built around the main shaft 26 that drives the fan. Efficiency of the hybrid electric gas turbine engine 10 may be improved by reducing the size of the high speed spool, reducing the size of the shaft within the gas generating core 50, and operating the gas generating core 50 at an elevated high overall pressure ratio. In this manner, overall efficiency of the engine is improved.

The reduced size of the gas generating core 50 enables the integration of the electric motor 90 within the footprint of the inner fixed structure 27 of the fan section 12. As shown in FIG. 1, a shroud 80 may be disposed about at least a portion of the gas generating core 50 and about the electric motor 90. The shroud 80 axially extends, relative to the central longitudinal axis 28, from the static structure (e.g. the inner fixed structure 27) towards the turbine 42 of the turbine section 14. The shroud 80 may at least partially define the footprint of the inner fixed structure 27 of the fan section 12.

The electric motor 90 is disposed radially inward from the gas generating core 50. In additional embodiments, an additional electric motor may be provided that is remotely located.

Figure 3:
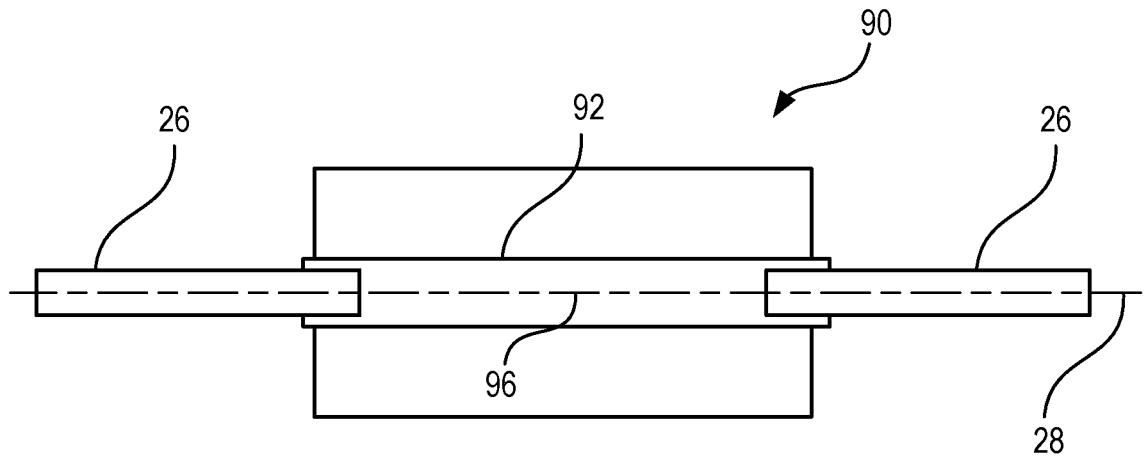
FIG. 3 illustrates a schematic view of an electric motor drivably coupled to a main shaft of the hybrid electric gas turbine engine, in accordance with various embodiments.

With combined reference to FIG. 2 and FIG. 3, the electric motor 90 includes a rotatable shaft 92 that extends along an electric motor axis 96. The electric motor axis 96 is coaxial with the central longitudinal axis 28. The electric motor axis 96 is spaced apart from axis 62. The shaft 92 of the electric motor 90 drivably connects the electric motor 90 to the main shaft 26 such that the electric motor 90 may be driven by the main shaft 26 and/or the electric motor 90 may drive the hybrid electric gas turbine engine 10.

The shaft 92 may enable the transfer of rotary motion from the electric motor 90 to the main shaft 26 and vice versa. In various embodiments, the shaft 92 rotates at the same rotational velocity as the main shaft 26. Shaft 92 may be directly coupled to main shaft 26 via a splined connection, a keyed connection, a clamped connection, or any other suitable connection for end-to-end shaft connections. In various embodiments, main shaft 26 may be split into two separate shaft portions extending from opposite ends of electric motor 90. In various embodiments, electric motor 90 may receive electrical power from one or more batteries located on board the aircraft.

Figure 4:
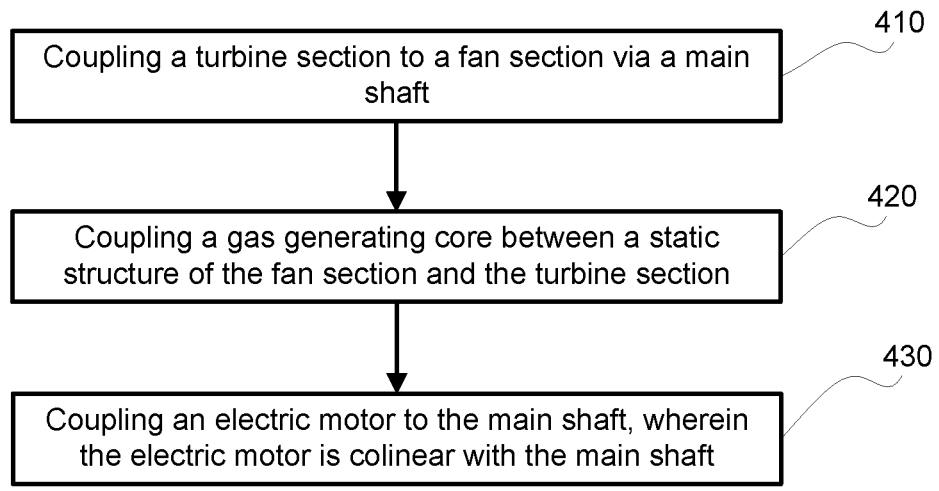
FIG. 4 illustrates a method for assembling a hybrid electric gas turbine engine, in accordance with various embodiments.

With reference to FIG. 4, a method 400 for assembling a hybrid electric gas turbine engine is provided, in accordance with various embodiments. Method 400 includes coupling a fan section to a turbine section via a main shaft (step 410). Method 400 includes coupling a gas generating core between a static structure of the fan section and the turbine section (step 420). The gas generating core may be coupled to the static structure via a bolted connection, a welded connection, or any other suitable connection. Method 400 includes coupling an electric motor to the main shaft, wherein the electric motor is colinear with the main shaft (step 430).

Figure 5:
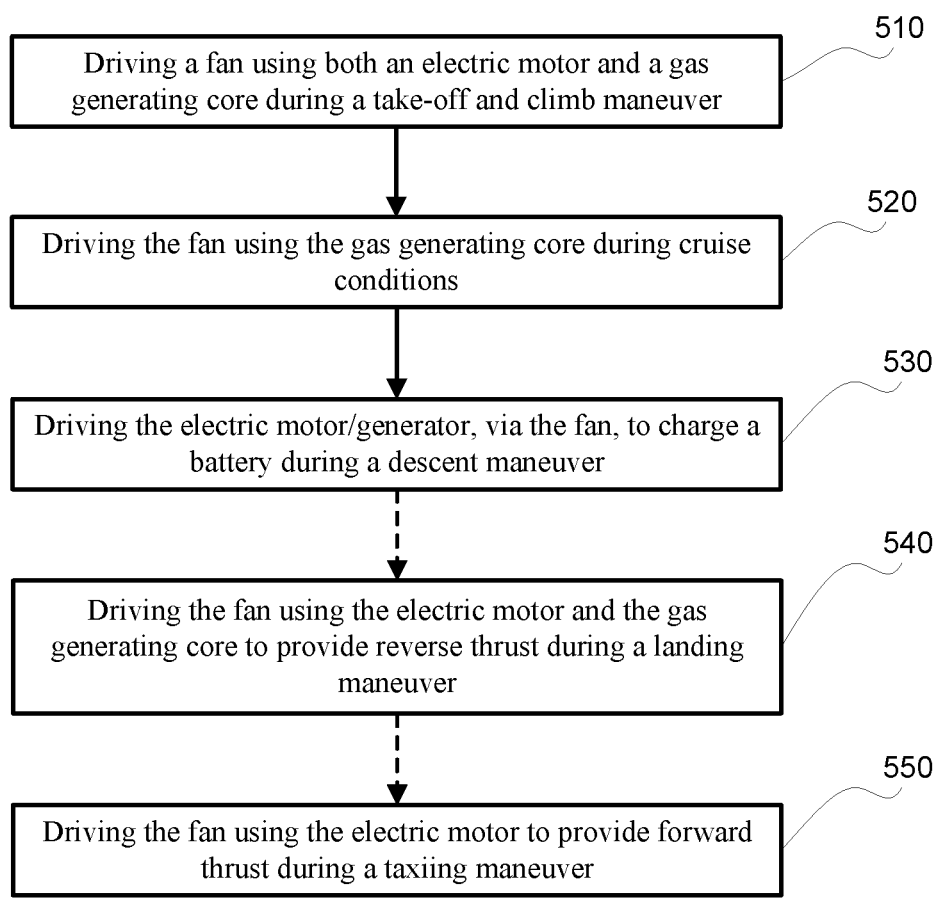
FIG. 5 illustrates a method for operating a hybrid electric gas turbine engine, in accordance with various embodiments.

With reference to FIG. 5, a method 500 for operating a hybrid electric gas turbine engine is provided, in accordance with various embodiments. Method 500 includes driving a fan using both an electric motor and a gas generating core to provide forward thrust during a take-off and climb maneuver (step 510). Method 500 includes driving a fan using the gas generating core to provide forward thrust during cruise conditions (step 520). Method 500 includes driving the electric motor/generator, via the fan, to charge a battery during a descent maneuver, wherein the fan is driven by ram air (step 530). In various embodiments, method 500 may further include driving the fan using the electric motor and the gas generating core during a landing maneuver to provide reverse thrust (step 540). In various embodiments, method 500 may further include driving the fan using the electric motor during a taxiing maneuver to provide forward thrust (step 540).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid electric gas turbine engine, comprising:
a fan section having a fan and a fan case;
an inner fixed structure;
a guide vane extending from the inner fixed structure to the fan case;
a turbine section having a turbine drivably connected to the fan through a main shaft that extends along a central longitudinal axis;
a gas generating core extending along a first axis that is radially offset from the central longitudinal axis; and
an electric motor drivably connected to the main shaft, wherein the electric motor is collinear with the main shaft;
wherein an inlet to the gas generating core is disposed radially outward from a portion of the inner fixed structure to which the guide vane is attached, the fan is configured to deliver a flow of air across the guide vane and into the inlet of the gas generating core, and at least a portion of the guide vane is upstream of the inlet to the gas generating core such that the flow of air passes along the at least a portion of the guide vane and subsequently into the inlet to the gas generating core.

2. The hybrid electric gas turbine engine of claim 1, wherein the gas generating core is sized and configured to provide between 30% and 70% of a maximum static takeoff thrust of the hybrid electric gas turbine engine.

3. The hybrid electric gas turbine engine of claim 1, wherein the first axis is in a non-parallel relationship with the central longitudinal axis.

4. The hybrid electric gas turbine engine of claim 1, wherein the gas generating core includes a compressor section extending along the first axis.

5. The hybrid electric gas turbine engine of claim 1, wherein the electric motor comprises a motor shaft extending along an electric motor axis, wherein the electric motor axis is in collinear relationship with the central longitudinal axis.

6. The hybrid electric gas turbine engine of claim 5, wherein the electric motor is configured to drive the fan.

7. The hybrid electric gas turbine engine of claim 1, wherein the electric motor is configured to be driven by the main shaft.

8. The hybrid electric gas turbine engine of claim 1, wherein the inlet to the gas generating core is disposed radially outward from a radially inward end of the guide vane, and the inlet to the gas generating core is radially aligned between the central longitudinal axis and the fan case.

9. The hybrid electric gas turbine engine of claim 1, wherein the inlet to the gas generating core is radially aligned between the central longitudinal axis and the fan case.

10. A hybrid electric gas turbine engine, comprising:
a fan section having a fan and a guide vane extending from a static structure to a fan case;
a turbine section having an exit housing and a turbine drivably connected to the fan through a main shaft that extends along a central longitudinal axis;
a gas generating core extending along a first axis that is radially offset from the central longitudinal axis;
an inlet duct whereby the gas generating core receives air from the fan section, the inlet duct is disposed radially outward from a portion of the inner fixed structure to which the guide vane is attached; and
an electric motor drivably connected to the main shaft, the electric motor being radially offset from the gas generating core;
wherein at least a portion of the guide vane is upstream of the inlet duct so as to at least partially define a flow path whereby the air received from the fan section passes along the at least a portion of the guide vane and subsequently into the inlet duct.

11. The hybrid electric gas turbine engine of claim 10, further comprising a support structure extending between and operatively connects the static structure and the exit housing.

12. The hybrid electric gas turbine engine of claim 10, wherein the electric motor is disposed radially inward from the gas generating core.

13. The hybrid electric gas turbine engine of claim 10, further comprising a shroud extending from the static structure towards the turbine, the shroud being disposed about at least a portion of at least one of the electric motor, and the gas generating core.

14. The hybrid electric gas turbine engine of claim 10, further comprising:
  a shroud extending from the static structure towards the turbine, the shroud being disposed about at least a portion of at least one of the electric motor, and the gas generating core;
  wherein the inlet duct is disposed at least partially radially outward from the shroud, and the shroud extends past the static structure in the aft direction.

15. The hybrid electric gas turbine engine of claim 14, wherein the guide vane is disposed at least partially forward from the inlet duct.

16. The hybrid electric gas turbine engine of claim 14, wherein the inlet duct is disposed radially outward from the static structure.

17. The hybrid electric gas turbine engine of claim 14, wherein at least a portion of the inlet duct is disposed radially outward from a radially inward end of the guide vane.

18. The hybrid electric gas turbine engine of claim 10, wherein the inlet duct is disposed radially outward from the static structure.

19. The hybrid electric gas turbine engine of claim 18, further comprising an exhaust duct that extends from an end of the gas generating core towards the turbine.

20. A method for assembling a hybrid electric gas turbine engine, comprising:
  coupling a fan section having a fan to a turbine section having an exit housing via a main shaft that extends along a central longitudinal axis, wherein the turbine section is drivably connected to the fan via the main shaft;
  coupling a gas generating core between a static structure of the fan section and the turbine section, wherein the gas generating core extends along a first axis that is radially offset from the central longitudinal axis;
  coupling an electric motor to the main shaft, wherein the electric motor is collinear with the main shaft and drivably connected to the main shaft, the electric motor being radially offset from the gas generating core; and
  disposing a guide vane to extend from the static structure, wherein an inlet to the gas generating core is disposed radially outward from a portion of the static structure to which the guide vane is attached, wherein at least a portion of the guide vane is upstream of the inlet to the gas generating core so as to at least partially define a flow path whereby the air received from the fan section passes along the at least a portion of the guide vane and subsequently into the gas generating core.

* * * * *